(12) United States Patent
Takeshima

(10) Patent No.: US 7,669,503 B2
(45) Date of Patent: Mar. 2, 2010

(54) GRIP FOR PARKING BRAKE OPERATING LEVER

(75) Inventor: Toshiro Takeshima, Toyota (JP)

(73) Assignee: Toyoda Iron Works Co., Ltd., Toyota-shi, Aichi-ken (JP)

( * ) Notice: Subject to any disclaimer, the term of this patent is extended or adjusted under 35 U.S.C. 154(b) by 100 days.

(21) Appl. No.: 11/635,692

(22) Filed: Dec. 8, 2006

(65) Prior Publication Data

US 2008/0072701 A1    Mar. 27, 2008

(30) Foreign Application Priority Data

Sep. 22, 2006    (JP) .............................. 2006-256943

(51) Int. Cl.
*B60T 7/08*    (2006.01)
*B25G 1/00*    (2006.01)

(52) U.S. Cl. .............................. 74/557; 74/523; 74/543; 74/551.9; 74/558.5; 81/177.1; 81/489; 16/431; 16/436; 16/DIG. 12; 16/DIG. 19

(58) Field of Classification Search ................ 74/551.9; 16/431, 436, DIG. 12, DIG. 19; 81/489
See application file for complete search history.

(56) References Cited

U.S. PATENT DOCUMENTS 4,466,309 A * 8/1984 Matey ........................ 74/551.9
5,640,741 A * 6/1997 Yano ............................ 16/421
6,108,869 A * 8/2000 Meessmann et al. .......... 16/430
6,119,309 A * 9/2000 Lu .............................. 16/114.1
6,196,562 B1 * 3/2001 Zhuang ................... 280/47.38

FOREIGN PATENT DOCUMENTS

DE    10236129    2/2004

* cited by examiner

*Primary Examiner*—Richard W L Ridley
*Assistant Examiner*—Thomas Diaz
(74) *Attorney, Agent, or Firm*—Finnegan, Henderson, Farabow, Garrett & Dunner, LLP

(57) ABSTRACT

A grip for a parking-brake operating lever includes a tubular-shaped grip main body which is press-fitted on a lever main body of the operating lever so as to be mounted on an outer circumferential periphery of the lever main body, a grip cover which is mounted on a part of a circumferential periphery of the grip main body, an engaging tab which projects from an inner surface of the grip cover and which is inserted through an insertion hole provided in the grip main body and is held in engagement with an engaging portion provided in the lever main body, such that the engaging tab is movable relative to the engaging portion in a longitudinal direction of the lever main body, and a fitting protrusion and recess which are respectively provided in the inner surface of the grip cover and the outer circumferential surface of the grip main body, and which are held in fitting engagement with each other for positioning the grip cover in a predetermined relative to the grip main body.

6 Claims, 3 Drawing Sheets ns and recesses each provided by the fitting protrusion and
GRIP FOR PARKING BRAKE OPERATING LEVER This application is based on Japanese Patent Application No. 2006-256943, the content of which is incorporated hereinto by reference.

BACKGROUND OF THE INVENTION

1. Field of the Invention

The present invention relates in general to a grip for a parking-brake operating lever, and more particularly to an improvement of a grip of type in which a grip cover is mounted on a part of a circumferential periphery of a tubular-shaped grip main body.

2. Discussion of Prior Art

As a kind of resin-made grip that is to be mounted on a gripped portion of a parking-brake operating lever, there is proposed a grip having (a) a tubular-shaped grip main body which is made of synthetic resin, and which is press-fitted onto the elongated-shaped lever main body from a distal end thereof so as to be integrally mounted on an outer circumferential periphery of the lever main body, and (b) a grip cover which is made of synthetic resin and which has a predetermined length in a longitudinal direction of the grip main body. The grip cover is curved to conform to a contour of an outer circumferential surface of the grip main body, and is integrally mounted on a part of a circumferential periphery of the grip main body. A grip disclosed in Patent Document 1 is an example of such a grip. In Patent Document 1, the gripped portion of the parking-brake operating lever that is disposed in a center console on the side of an operator's seat is held substantially horizontal in a non-operation state of the parking brake, while the tubular-shaped grip main body is integrally mounted on the gripped portion and is covered at its upper surface portion with the grip cover. The provision of the grip cover in addition to the grip main body makes it possible to improve the design (appearance) and also to improve the feeling given to the operator who grips the grip to operate the parking brake. The design nature and the operation feeling can be improved by suitably determining materials and colors of the grip cover and the grip main body.

Patent Document 1: DE 10236129 A1

As a simple technique of attaching the grip cover to the grip main body, there is an arrangement in which an engaging tab projecting from an inner surface of the grip cover (an surface of the grip cover on the side of the grip main body) is inserted through an insertion hole formed in the grip main body. The engaging tab is pressed against an engaging portion provided in the lever main body, and is elastically deformed so as to be brought into unremovable engagement with the engaging portion.

However, it is inevitable that the mount position of the grip main body press-fitted onto the lever main body is variable in the longitudinal direction of the lever main body, so that there is a possibility that the grip cover engaged with the lever main body deviates from a predetermine position relative to the grip main body. There is a case where each of side end edges of the grip cover has an inclined portion that is inclined with respect to the longitudinal direction of the grip cover, wherein the grip cover is mated with the grip main body such that the side end edges are held in close contact with respective steps of the grip main body extending along the side end edges of the grip cover. In such a case, if the grip cover deviates from the predetermined position relative to the grip main body in the longitudinal direction, there would be formed a gap between each of the side end edges of the grip cover and a corresponding one of the steps of the grip main body, thereby deteriorating the appearance of the grip and the operation feeling given to the operator who grips the grip.

On the other hand, it might be possible to arrange the engaging tab to be engaged with the lever main body with a predetermined amount of play in the longitudinal direction of the lever main body, for allowing the grip cover to be positioned in the predetermined position relative to the grip main body, irrespective of the variation of the mount position of the grip main body. However, if the grip cover is thus attached movably in the longitudinal direction, there is a possibility that the grip cover is moved during an operation to pivot the parking-brake operating lever by gripping the grip, so that there is still risk of deterioration of the appearance and the operation feeling.

The present invention was made in the light of the background art discussed above. It is therefore an object of the invention to make it possible, in an arrangement in which a grip cover can be attached to a lever main body through an engaging tab with "one-touch" operation, to reliably position the grip cover in a predetermined position relative to the grip main body, for thereby improving the design nature and the operation feeling.

SUMMARY OF THE INVENTION

For achieving the above object, the first invention provides a grip which is to be provided on a parking-brake operating lever, and which is to be gripped by an operator so as to be operatively pivoted integrally with a lever main body of the parking-brake operating lever, the grip having: a tubular-shaped grip main body which is made of synthetic resin, and which is press-fitted onto an elongated-shaped portion of the lever main body from a distal end thereof so as to be integrally mounted on an outer circumferential periphery of the lever main body; and a grip cover which is made of synthetic resin and which has a predetermined length in a longitudinal direction of the grip main body, the grip cover being curved to conform to a contour of an outer circumferential surface of the grip main body, and being integrally mounted on a part of a circumferential periphery of the grip main body, the grip being characterized by having: an engaging tab which projects from an inner surface of the grip cover, and which is inserted through an insertion hole formed in the grip main body, the engaging tab being pressed against an engaging portion provided in the lever main body, and being elastically deformed so as to be brought into unremovable engagement with the engaging portion, the engaging tab having a predetermined amount of play in a longitudinal direction of the lever main body; and fitting protrusion and recess that are respectively provided in one and the other of the inner surface of the grip cover and the outer circumferential surface of the grip main body that are opposed to each other, the fitting protrusion and recess being brought into fitting engagement with each other upon engagement of the grip cover with the lever main body through said engaging tab, for positioning the grip cover in a predetermined position relative to the grip main body.

The second invention is, in the grip of the first invention, characterized by having a plurality of pairs of fitting protrusions and recesses each provided by the fitting protrusion and recess, the plurality of pairs of fitting protrusions and recesses are spaced apart from each other in the longitudinal direction of the grip main body.

The third invention is, in the grip of the second invention, characterized in that fitting protrusion and recess of at least one of the plurality of pairs of fitting protrusions and recesses are circular in cross section, and the at least one of the plurality of pairs of fitting protrusions and recesses have a fitting depth larger than that of the other of the plurality of pairs of fitting protrusions and recesses so as to be first fitted with each other.

The fourth invention is, in the grip of any one of the first through third inventions, characterized in that each of side end edges of the grip cover has an inclined portion that is inclined with respect to a longitudinal direction of the grip cover, the grip main body has steps along the side end edges of the grip cover, and the grip cover is mated with the grip main body such that the side end edges are held in close contact with the respective steps.

In the grip for the parking-brake operating lever, the engaging tab of the grip cover is elastically deformed to be brought into unremovable engagement with the engaging portion of the lever main body, by pressing the engaging tab against the engaging portion, so that the grip cover can be easily attached to the lever main body with "one-touch" operation. Further, since the engaging tab has the play in the longitudinal direction relative to the lever main body, the grip cover can be attached to be positioned in a predetermined position relative to the grip main body, irrespective of variation of a mount position of the grip main body that is press-fitted onto the lever main body. Moreover, since the grip main body and the grip cover are positioned relative to each other by the fitting engagement of the fitting protrusion and recess with each other, the grip cover can be reliably positioned in the predetermined position relative to the grip main body, in spite of the play of the engaging tab, thereby eliminating risk of deterioration of the appearance of the grip which could be caused by deviation of the grip cover from the predetermined position relative to the grip main body and also risk of deterioration of the feeling that is given to the operator who grips the grip to operate the parking brake.

In the second invention in which the plurality of pairs of fitting protrusions and recesses are spaced apart from each other in the longitudinal direction of the grip main body, the grip cover can be attached to be positioned in the predetermined position relative to the grip main body such that the grip cover is unrotatable and otherwise unmovable, thereby preventing deterioration of the operation feeling that could be caused by rotation or misalignment of the grip cover relative to the grip main body in a circumferential direction about a center of the fitting engagement of each pair of fitting protrusion and recess. Further, in the third invention, the fitting protrusion and recess of at least one of the plurality of pairs of fitting protrusions and recesses are circular in cross section, and the at least one of the plurality of pairs of fitting protrusions and recesses have a fitting depth larger than that of the other of the plurality of pairs of fitting protrusions and recesses, so as to be first fitted with each other. This arrangement in the third invention improves an operability in an operation to fit the plurality of pairs of fitting protrusions and recesses. That is, since the fitting protrusion and recess of the above-described at least one of the plurality of pairs of fitting protrusions and recesses, which are first fitted with each other, are circular in cross section, the at least one of the plurality of pairs of fitting protrusions and recesses can be fitted with each other even with misalignment of the grip cover relative to the grip main body in the circumferential direction about the center of the fitting engagement thereof, and the other pair or pairs of fitting protrusions and recesses can be positioned relative to each other by aligning the fitting protrusions and recesses in the circumferential direction about the center of the fitting engagement of the at least one of the plurality of pairs of fitting protrusions and recesses. As a whole, accordingly, the operation to attach the grip cover and the grip main body to each other can be easily and rapidly carried out, and automatization of the attaching operation is facilitated.

In the fourth invention, each of the side end edges of the grip cover has the inclined portion that is inclined with respect to the longitudinal direction, the grip main body has the steps extending along the respective side end edges of the grip cover, and the grip cover is mated with the grip main body such that the side end edges are held in close contact with the respective steps. In this arrangement, if the grip cover deviates from the predetermined position relative to the grip main body in the longitudinal direction, there would be formed a gap between each of the side end edges of the grip cover and a corresponding one of the steps of the grip main body, thereby problematically deteriorating the appearance of the grip and the feeling given to the operator who grips the grip. However, in the present invention, such a problem can be avoided by the fitting engagement of the fitting protrusion and recess that causes the grip cover to be positioned in the predetermined position relative to the grip main body.

The present invention may be applied to, for example, a parking-brake operating lever which is disposed in a center console on the side of an operator's seat and whose gripped portion is held substantially horizontal during a non-operation state of the parking brake, such that the grip main body is fixedly press-fitted on the gripped portion and is covered at its upper surface portion with the grip cover that is attached to the lever main body. However, the invention may be applicable as the grip for the parking-brake operating lever of various kinds such as a parking-brake operating lever, which is disposed in a lower portion of an instrument panel in a front side of the operator's seat such that its gripped portion faces upwardly. Further, the grip cover may be attached to the grip main body so as to be positioned in a position relative to the grip main body, which position is suitably determined.

The materials and colors of the grip cover and the grip main body are suitably determined by taking account of the design nature and the feeling that is to be given to the operator who grips the grip to operate the parking brake. However, in view of necessity of press-fitting of the grip main body into the lever main body, the grip main body is preferably made of synthetic resin that is relatively soft, while the grip cover does not have to be made of a soft material but may be made of a hard material. Where the engaging tab is formed of synthetic resin integrally with the grip cover, the synthetic resin having a predetermined degree of elasticity is employed for allowing the engaging tab to be elastically deformed to be brought into engagement with the engaging portion. Further, it is also possible to integrally fix a predetermined outer layer onto surfaces of the grip main body and the grip cover.

The engaging tab does not necessarily have to be made of the synthetic resin, but may be made of a metallic material so as to be formed independently of the grip cover. In such a case, it is preferable that the engaging tab is partially embedded into the grip cover, for example, in an insert forming process, so that the engaging tab is integral with the grip cover. The number of pair of engaging tab and engaging portion may be only one. However, it is preferable that a plurality pair of the engaging tabs and portions are provided to be spaced apart from each other in the longitudinal direction.

The fitting protrusion and recess are provided, for example, in the grip cover and the grip main body, respectively. However, the fitting protrusion and recess may be provided in the grip main body and the grip cover, respectively. Further, a plurality pair of the fitting protrusion and recess may be provided to be spaced apart from each other in the longitudinal direction. The fitting protrusion and recess are arranged to inhibit movement of the grip cover relative to the grip main body in any direction including the longitudinal direction of the lever main body. However, where the relative movement in a direction perpendicular to the longitudinal direction can be inhibited by other elements such as the engaging tab and the step, the fitting protrusion and recess may be arranged to inhibit only the relative movement in the longitudinal direction.

The fitting protrusion and recess are provided, for example, integrally in the grip cover and grip main body. However, the fitting protrusion and recess may be constituted by any one of various arrangements such as an arrangement in which the fitting protrusion is made of a metallic material or the like to be formed independently of the grip cover or grip main body and is integrally fixed to the grip cover or grip main body, for example, in an insert forming process. Further, the fitting recess may be provided merely by a recess or groove, for example. However, the fitting recess may be provided by a through-hole, too.

For facilitating the fitting engagement of the fitting protrusion and recess with each other, a distal end portion of the fitting protrusion and/or an opening portion of the fitting recess may be straight-chamfered or roundly-chamfered, or may be provided with a guide surface that is tapered or inclined. The fitting engagement of the fitting protrusion and recess can be facilitated even by simply thinning the distal end portion of the fitting protrusion. The thinning of the distal end portion can be made, for example, by cutting off, along an inclined plane, a part of the distal end portion of the fitting protrusion having a columnar, tubular or prismatic shape, or by perpendicularly cutting out a part of the distal end portion of the fitting protrusion.

In the third invention, the fitting protrusion and recess of at least one of the plurality of pairs are circular in cross section. The fitting protrusion of the at least one of the plurality of pairs of fitting protrusions and recesses may have either a hollow cylindrical shape or a solid cylindrical shape. The fitting protrusions and recesses of the other pair or pairs may be circular in cross section. However, the fitting protrusions and recesses of the other pair or pairs may be constituted by any one of various arrangements such as an arrangement in which the fitting protrusion and recess are provided by straight-linear-shaped protrusion and recess that are elongated in the longitudinal direction of the grip main body and an arrangement in which the fitting protrusion and recess are provided by cross-shaped protrusion and recess including, in addition to the above-described straight-linear-shaped protrusion and recess, other straight-linear-shaped protrusion and recess that intersect with the longitudinal direction.

The fitting depth of the fitting protrusion and recess of the above-described at least one of the plurality of pairs of fitting protrusions and recesses, which are first brought into fitting engagement with each other and are circular in cross section, is larger than the fitting depth of the fitting protrusions and recesses of the other pair or pairs, for example, by about 20-100%, so that the fitting protrusion and recess of the above-described at least one pair can be brought into fitting engagement with each other prior to fitting engagements of the fitting protrusions and recesses of the other pair or pairs. Namely, a protruding length and a depth of the respective fitting protrusion and recess of the above-described at least one pair are larger than those of the fitting protrusions and recesses of the other pair or pairs, for example, by about 20-100%.

The plurality of pairs of fitting protrusions and recesses may be provided by two pairs of fitting protrusions and recesses that are spaced apart from each other in the longitudinal direction. However, the plurality of pairs of fitting protrusions and recesses may be provided by three pairs of fitting protrusions and recesses, too. The fitting protrusion and recess of the above-described at least one pair, which are first brought into fitting engagement with each other and are circular in cross section, may be located either in a distal end portion or a proximal end portion of the grip. Where three or more pairs of fitting protrusions and recesses are provided, the fitting protrusion and recess of the above-described at least one pair may be located in a central portion or other intermediate portion of the grip.

The effect of the present invention becomes remarkable, particularly, where each of the side end edges of the grip cover has an inclined portion that is inclined with respect to the longitudinal direction as in the fourth invention. However, even where each of the side end edges of the grip cover is defined by a straight line that is parallel to the longitudinal direction throughout a longitudinal length of the grip cover, the fitting engagement of the fitting protrusion and recess inhibits the relative movement, eliminating risk of deterioration of the operation feeling due to movement of the grip cover during operation of the parking brake, whereby the effect of the invention can be obtained.

In the fourth embodiment, each of the side end edges of the grip cover may be defined by any one of various shapes such as straight and curved lines inclined with respect to the longitudinal direction and also a combination of the straight and curved lines. Further, each of the side end edges of the grip cover may include a straight linear portion parallel to the longitudinal direction. Moreover, as long as either one of the side end edges in respective opposite side portions of the grip cover includes the inclined portion, the other of the side end edges may be defined by a straight line parallel to the longitudinal direction.

While the grip main body is provided with the steps in the fourth invention, the grip main body does have to be provided with the steps in the first invention. That is, the first invention may be carried out with an arrangement in which the grip cover is mated with the grip main body such that the grip cover is merely superposed on an outer circumferential surface of the grip main body that has no step.

BRIEF DESCRIPTION OF THE DRAWINGS

FIGS. 1A-1D are views for explaining a parking-brake operating lever on which a grip according to an embodiment of the present invention is mounted, wherein FIG. 1A is a plan view, FIG. 1B is a front view, FIG. 1C is a cross sectional view taken along line 1C-1C in FIG. 1B, and FIG. 1D is a cross sectional view taken along line 1D-1D in FIG. 1B.

DETAILED DESCRIPTION OF THE INVENTION

There will be described in detail an embodiment of the present invention, with reference to the drawings.

Figure 1A:
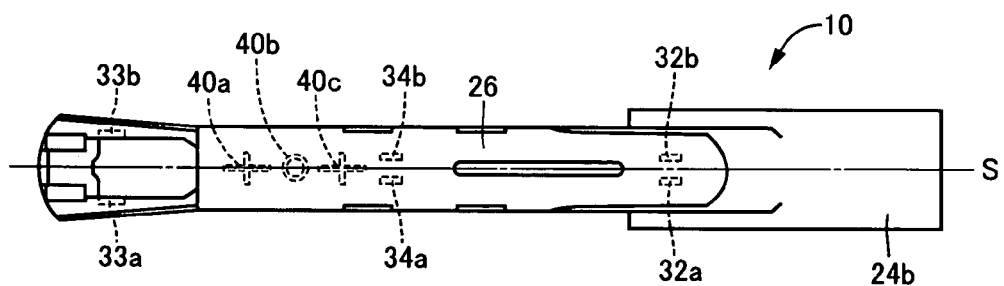
Figure 1B:
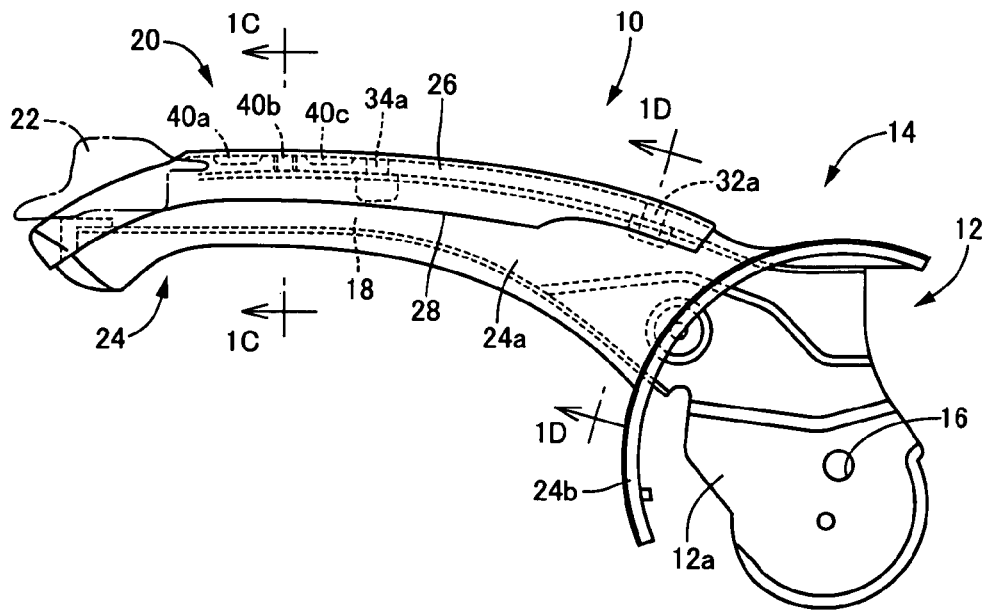
Figure 1C:
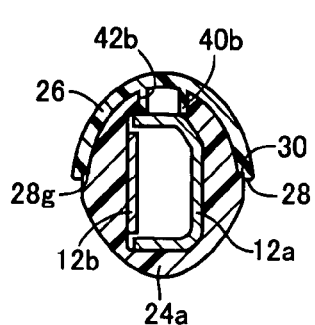
Figure 1D:
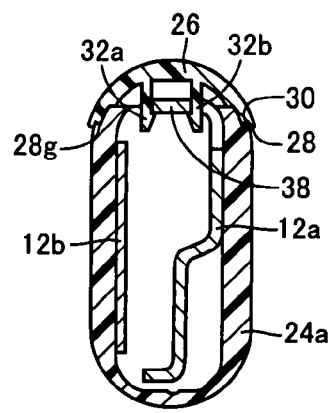

FIGS. 1A-1D are views for explaining a parking-brake operating lever 14 having a lever main body 12 on which a grip 10 according to an embodiment of the present invention is mounted, wherein FIG. 1A is a plan view, FIG. 1B is a front view, FIG. 1C is a cross sectional view taken along line 1C-1C in FIG. 1B, and FIG. 1D is a cross sectional view taken along line 1D-1D in FIG. 1B. The lever main body 12 is supported by a support member (e.g., sector) that is not shown in FIG. 1A-1D, through a support hole 16 provided in a right-side proximal end portion of the lever main body 12, such that the lever main body 12 is pivotable about a pivot axis that is substantially horizontal. The lever main body 12 includes an elongated projection portion 18 that extends straightly from the proximal end portion. The projection portion 18 receives the grip 10 that is integrally mounted thereon, so as to constitute a gripped portion 20 that is to be gripped by an operator who operates the parking-brake operating lever 14. As is apparent from the cross sectional views of FIGS. 1C and 1D, the lever main body 12 is constituted by a pair of metal plates 12a, 12b, although the metal plate 12b as a front one of the metal plates 12a, 12b is not shown in FIG. 1B.

The parking-brake operating lever 14 is disposed in a center console on the side of an operator's seat of a vehicle. In a non-operation state of the parking brake, the gripped portion 20 is held in a posture, as shown in FIG. 1B, causing the gripped portion 20 to extend substantially horizontally toward a front portion of the vehicle (in a leftward direction as seen in FIG. 1B). When the lever main body 12 is pivoted clockwise about the support hole 16 as a result of an upward displacement of the gripped portion 20 that is caused by the operator gripping the gripped portion 20, a parking cable (not shown) is pulled whereby the parking brake is operated. The parking-brake operating lever 14 is provided with a release rod (not shown) and a pawl (not shown) that is arranged to mesh with a ratchet provided in the above-described support member, in addition to a release knob 22 that is to be operatively pressed for releasing the parking brake.

Figure 2A:
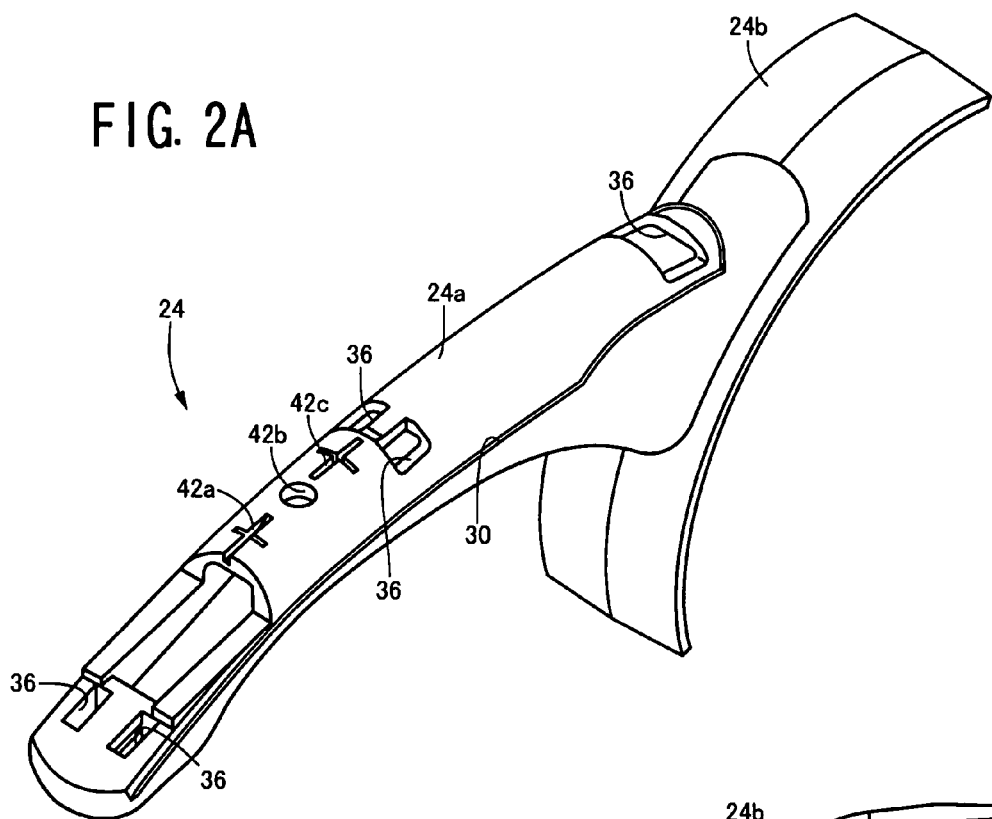
FIGS. 2A and 2B are perspective views showing a grip main body of the grip of FIGS. 1A-1D.
Figure 2B:
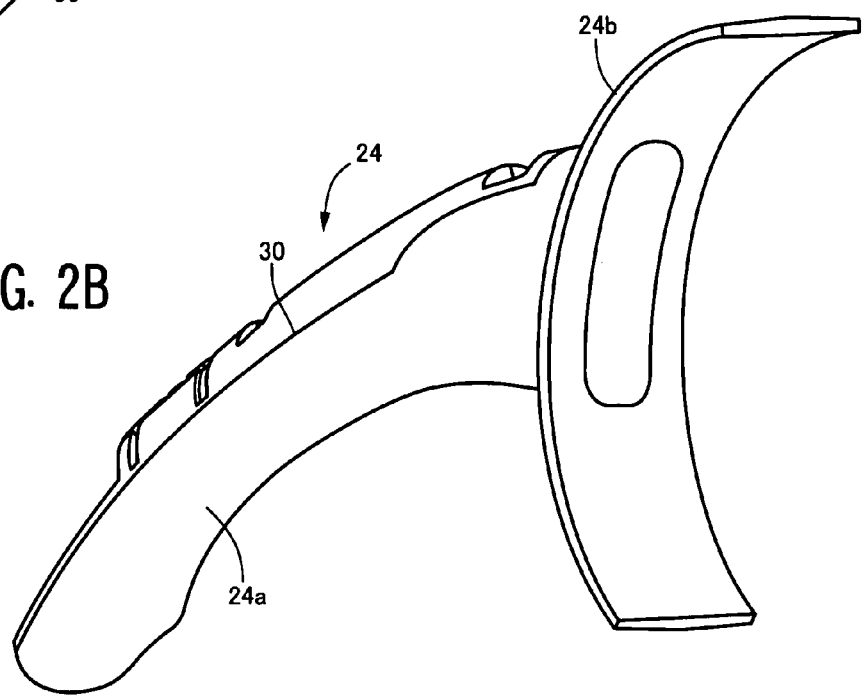

The grip 10 has a grip main body 24 that is integrally mounted on an outer circumferential surface of the projection portion 18 of the lever main body 12, and a grip cover 26 that is mated with the grip main body 24 so as to cover an upper surface portion of the grip main body 24. The grip main body 24 has a tubular-shaped portion 24a and an arcuate-shaped brim portion 24b that are integral with each other. The tubular-shaped portion 24a is press-fitted onto the lever main body 12 from a distal end portion of the projection portion 18. The brim portion 24b is integrally provided in a press-fitting side end portion of the tubular-shaped portion 24a. The grip main body 24 is made of a synthetic resin material that is relatively soft, so that the grip main body 24 can be integrally press-fitted onto the projection portion 18 to be integrally fixed to the lever main body 12, owing to elastic deformation of the tubular-shaped portion 24a. The projection portion 18 of the lever main body 12 has a vertical dimension that gradually increases in a direction toward the proximal end portion of the lever main body 12. With the tubular-shaped portion 24a being press-fitted onto the outer circumferential surface of the projection portion 18 by a predetermined amount of press-fitting load, the grip main body 24 is integrally fixed in a predetermined mount position relative to the lever main body 12. The arcuate-shaped brim portion 24b, which is provided to cover the proximal end portion of the lever main body 12 irrespective of pivot motion of the parking-brake operating lever 14, extends in a circumferential direction about the support hole 16 over a predetermined angular range. FIG. 2A and 2B are views showing only the grip main body 24, wherein FIG. 2A is the perspective view as seen from a diagonally upper side of the tubular-shaped portion 24a while FIG. 2B is the perspective view as seen from a diagonally lower side of the brim portion 24b. The grip main body 24 may has ribs or the like, as needed, for obtaining a predetermined degree of strength.

Figure 3A:
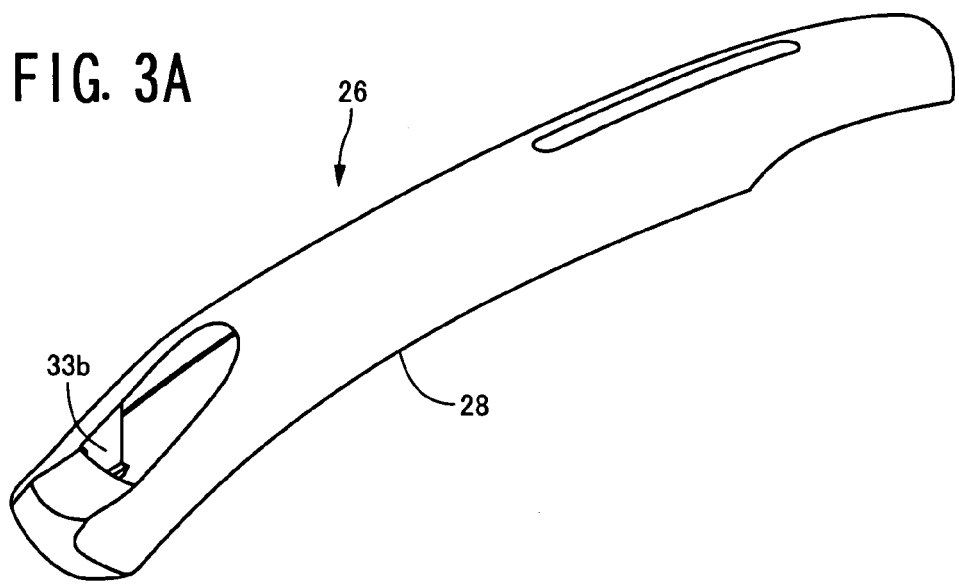
FIGS. 3A and 3B are perspective views showing a grip cover of the grip of FIGS. 1A-1D.
Figure 3B:
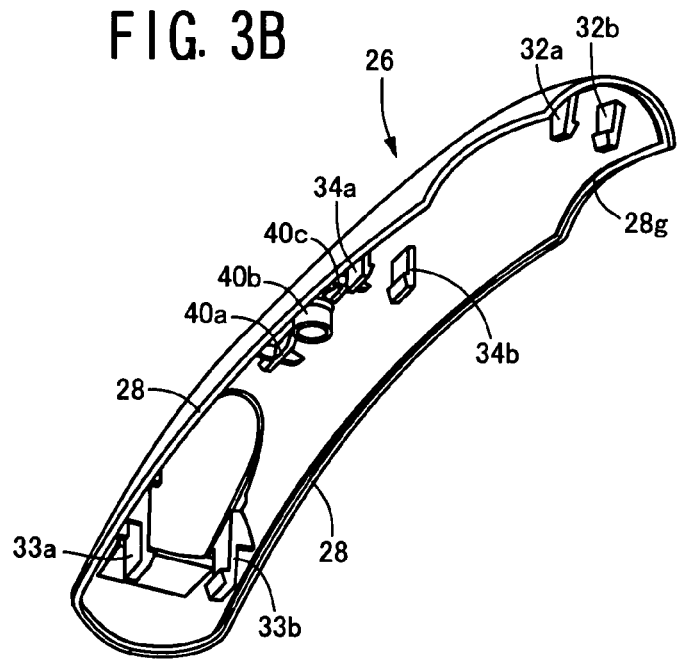
Figure 3C:
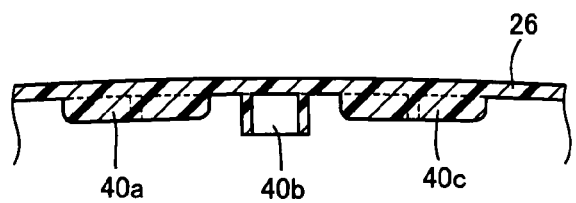
FIG. 3C is a cross sectional view showing a part of the grip cover.

The grip cover 26 is provided by an elongated-shaped member made of a synthetic resin material that is relatively hard, and has substantially the same length as the tubular-shaped portion 24a of the grip main body 24. The grip cover 26 is curved to conform to a contour of an outer circumferential surface of an upper portion of the tubular-shaped portion 24a, and is superposed on an upper part of a circumferential periphery of the tubular-shaped portion 24a so as to be integrally mounted on the grip main body 24. FIGS. 3A-3C are views showing only the grip cover 26, wherein FIG. 3A is the perspective view as seen from a diagonally upper side of the grip cover 26, FIG. 3B is the perspective view as seen from a diagonally lower side of the grip cover 26, and FIG. 3C is a cross sectional view showing, in enlargement, a portion of the grip cover 26 that is provided with fitting protrusions 40a-40c.

The grip cover 26 has, in its widthwise opposite side portions, side end edges 28 which are identical in shape with each other. Each of the side end edges 28 is defined by a non-straight line that is smoothly curved to be upwardly convex as a whole. Each of the side end edges 28 has, in its respective opposite end portions, inclined portions each of which is curved by a relatively large degree, and is inclined as a whole with respect to the longitudinal direction, i.e., a horizontal direction as seen in FIG. 1B. The grip main body 24 has, in its respective opposite end portions, steps 30 extending along the respective side end edges 28. The grip cover 26 is mated with the grip main body 24 such that the side end edges 28 are held in close contact with the respective steps 30. An inside step 28g is provided in an inside portion of each of the side end edges 28. As shown in FIGS. 1C and 1D, the inside step 28g is held in contact with a corresponding one of the steps 30 of the grip main body 24, while an outside portion of each of the side end edges 28 extends down to a position that is slightly lower than the corresponding step 30, so as to cover the corresponding step 30. The grip main body 24 and the grip cover 26 have predetermined colors such that combination of the colors of the grip main body 24 and the grip cover 26 cooperates with shape of the side end edges 28 to provide a predetermined aesthetic effect.

Three pairs of engaging tabs 32a, 32b, 33a, 33b, 34a, 34b are provided to project downwardly from an inner surface of the grip cover 26, i.e., from a lower surface of the grip cover 26 that is opposed to an outer circumferential surface of the grip main body 24. The engaging tabs 32a, 32b, 33a, 33b, 34a, 34b are inserted through a plurality of insertion holes 36 provided in the grip main body 24, and are unremovably engaged with the lever main body 12, whereby the grip cover 26 is integrally attached to the lever main body 12. With respect to the engaging tabs 32a, 32b located in a proximal end portion of the grip cover 26, described specifically, as shown in FIG. 1D, each of the engaging tabs 32a, 32b has, in its distal end portion, a tab portion that protrudes in a diagonally inward direction. The tab portion is arranged to be engaged at its back surface with an engaging portion 38 that is provided by the metal plate 12a. That is, with the grip cover 26 being pressed in a downward direction, the engaging tabs 32a, 32b are elastically deformed in respective opposite directions away from each other, by engagement of the back surfaces of the tab portions with respective side end edges of the engaging portion 38. Then, the tab portions are brought in unremovable engagement with the engaging portion 38, when the engaging tabs 32a, 32b restore elastically their original shapes as the tab portions pass over the respective side end edges of the engaging portion 38. Thus, the grip cover 26 is unremovably attached to the lever main body 12 easily with "one-touch" operation, namely, by simply pressing the grip cover 26 against the lever main body 12 (on which the grip main body 24 is mounted), in the downward direction in such a manner that causes the engaging tabs 32a, 32b, 33a, 33b, 34a, 34b (hereinafter referred simply to as engaging tabs 32a-34b where they are not particularly distinguished from each other) to be inserted through the insertion holes 36.

Since the grip main body 24 is fixedly press-fitted onto the projection portion 18 of the lever main body 12 owing to elastic deformation of the tubular-shaped portion 24a, it is inevitable that the mount position of the grip main body 24 relative to the lever main body 12 is variable in the longitudinal direction, so that there is a possibility that the grip cover 26 engaged with the lever main body 12 through the engaging tabs 32a-34b deviates from a predetermined position relative to the grip main body 24. If the grip cover 26 deviates from the predetermined position relative to the grip main body 24 in the longitudinal direction, there would be formed a gap between each of the side end edges 28 of the grip cover 26 and a corresponding one of the steps 30 of the grip main body 24. The formation of the gap therebetween would deteriorate the appearance of the grip 10 and the feeling given to the operator who grips the grip 10, providing the operator operating the parking brake with discomfortability. The engaging tabs 32a-34b are arranged to be symmetrical with respect to a centerline S extending in the longitudinal direction of the lever main body 12 and to be parallel to the centerline S, while the engaging portion 38 has a predetermined length as measured in the longitudinal direction. Each of the engaging tabs 32a-34b is held in engagement with the engaging portion 38, such that each of the engaging tabs 32a-34b is movable relative to the engaging portion 38 in the longitudinal direction, namely, has a predetermined amount of play relative to the lever main body 12. Owing to the play, irrespective of variation of the mount position of the grip main body 24, the grip cover 26 is allowed to be fixed always in the predetermined position relative to the grip main body 24, which position causes each of the side end edges 28 of the grip cover 26 in its entire length to be held in close contact with the corresponding step 30.

Further, for positioning the grip cover 26 in the predetermined position relative to the grip main body 24 (which position causes the side end edges 28 to be held in close contact with the respective steps 30) when the grip cover 26 is integrally attached to the lever main body 12 through the engaging tabs 32a-34b, the plurality of fitting protrusions 40a, 40b, 40c projecting from the inner surface of the grip cover 26 are arranged to lie on the centerline S and to be spaced apart from each other in the longitudinal direction, while a plurality of fitting recesses 42a, 42b, 42c are formed in the upper surface of the grip main body 24 so as to be fitted on the respective fitting protrusions 40a, 40b, 40c. The fitting protrusion 40b, as one of the protrusions 40a, 40b, 40c that is located between the other two of the protrusions 40a, 40b, 40c in the longitudinal direction, has a cylindrical shape, and is fitted in the fitting recess 42b having a circular hole shape. The fitting protrusion 40b and recess 42b are held in fitting engagement with each other by a fitting depth that is about 1.5 times to twice as large as a fitting depth by which each of the fitting protrusions 40a, 40c and a corresponding one of the fitting recesses 42a, 42c are held in fitting engagement with each other, so that the fitting protrusions 40b and recess 42b are first brought into fitting engagement with each other. The fitting protrusions 40a, 40c (which are located on respective opposite sides of the fitting protrusion 40b) and the fitting recesses 42a, 42c (which are fitted on the respective fitting protrusions 40a, 400 are provided by cross-shaped protrusions and recesses. Each of the cross-shaped protrusions and recesses is provided by a straight-linear-shaped protrusion or recess (that is elongated in the longitudinal direction parallel to the centerline S) and another straight-linear-shaped protrusion and recess (that intersects with the above-described straight-linear-shaped protrusion or recess at a right angle).

The fitting engagements of the three pairs of fitting protrusions 40a, 40b, 40c and recesses 42a, 42b, 42c inhibit movement of the grip cover 26 relative to the grip main body 24 in any direction including the longitudinal direction, whereby the grip cover 26 is positioned in the above-described predetermined position relative to the grip main body 24. For facilitating the fitting engagements of the fitting protrusions 40a, 40b, 40c and recesses 42a, 42b, 42c, a distal end portion of each of the fitting protrusions 40a, 40b, 40c and/or an opening portion of each of the fitting recesses 42a, 42b, 42c may be straight-chamfered or roundly-chamfered, or may be provided with a guide surface that is tapered or inclined. The fitting engagements of the fitting protrusions 40a, 40b, 40c and recesses 42a, 42b, 42c can be facilitated even by simply thinning the distal end portion of each of the fitting protrusions 40a, 40b, 40c. The thinning of the distal end portion can be made, for example, by cutting off, along an inclined plane, a part of the distal end portion of each of the fitting protrusions 40a, 40b, 40c, or by perpendicularly cutting out a part of the distal end portion of each of the fitting protrusions 40a, 40b, 40c. It is noted that the fitting protrusions 40a, 40b, 40c are formed of a synthetic resin material integrally with the grip cover 26 so as to be integral with the grip cover 26.

As described above, in the grip 10 according to the present embodiment, the engaging tabs 32a-34b of the grip cover 26 is elastically deformed to be brought into unremovable engagement with the engaging portion 38 of the lever main body 12, by pressing the engaging tabs 32a-34b against the opposite side portions of the engaging portion 38, so that the grip cover 26 can be easily attached to the lever main body 12 with "one-touch" operation. Further, since each of the engaging tabs 32a-34b has the play in the longitudinal direction relative to the lever main body 12, the grip cover 26 can be attached to be positioned in the predetermined position relative to the grip main body 24, irrespective of variation of the mount position of the grip main body 24 that is press-fitted onto the lever main body 12. Moreover, since the grip main body 24 and the grip cover 26 are positioned relative to each other by the fitting engagements of the fitting protrusions 40a, 40b, 40c and recesses 42a, 42b, 42c, the grip cover 26 can be reliably positioned in the predetermined position relative to the grip main body 24, in spite of the play of each of the engaging tabs 32a-34b, whereby, each of the side end edges 28 of the grip cover 26 in its entire length can be held in close contact with the corresponding step 30 of the grip main body 24. Thus, there is no risk of deterioration of the appearance of the grip 10 and the feeling that is given to the operator who grips the grip 10 to operate the parking brake, which deterioration could be caused by formation of a gap between each side end edge 28 and the corresponding step 30, due to misalignment of the grip cover 26 and the grip main body 24 relative to each other.

Further, in the present embodiment, since the three pairs of fitting protrusions 40a, 40b, 40c and recesses 42a, 42b, 42c are provided to be spaced apart from each other in the longitudinal direction of the grip main body 24, the grip cover 26 can be attached to be positioned in the predetermined position relative to the grip main body 24 such that the grip cover 26 is unrotatable and otherwise unmovable, thereby preventing deterioration of the operation feeling that could be caused by rotation or misalignment of the grip cover 26 relative to the grip main body 24 in a circumferential direction about a center of the fitting engagement of each pair of the fitting protrusion 40 and recess 42. Further, the fitting protrusion 40*b* and recess 42*b* that are located in a longitudinally central portion of the grip 10 are circular in cross section, and have the fitting depth larger than that of the other fitting protrusions 40*a*, 40*c* and recesses 42*a*, 42*c*, so as to be brought into fitting engagement with each other earlier than the other fitting protrusions 40*a*, 40*c* and recess 42*a*, 42*c*. This arrangement improves an operability in an operation to bring each of the three pairs of fitting protrusions 40*a*, 40*b*, 40*c* and a corresponding one of the recesses 42*a*, 42*b*, 42*c* into fitting engagement with each other. That is, since the fitting protrusion 40*b* and recess 42*b* that are first brought into fitting engagement with each other are circular in cross section, the fitting protrusion 40*b* and recess 42*b* can be brought into fitting engagement with each other even with misalignment of the grip cover 26 relative to the grip main body 24 in the circumferential direction about the center of the fitting engagement, and each of the other fitting protrusions 40*a*, 40*c* and a corresponding one of the recesses 42*a*, 42*c* can be positioned relative to each other by aligning them in the circumferential direction about the center of the fitting engagement of the fitting protrusion 40*b* and recess 42*b*. As a whole, accordingly, the operation to attach the grip cover 26 and the grip main body 24 to each other can be easily and rapidly carried out, and automatization of the attaching operation is facilitated.

The embodiment of the present invention has been described in detail with reference to the drawings. However, the described embodiment is a merely embodied form, and the present invention can be embodied with various modifications and improvements on the basis of knowledge of those skilled in the art.

The invention claimed is:

1. A grip which is to be provided on a parking-brake operating lever main body, the grip comprising:
    a grip main body which is mounted on an outer periphery of the lever main body;
    a grip cover which conforms to an outer surface of the grip main body, and which is mounted on a part of the outer surface of the grip main body;
    an engaging tab which projects from an inner surface of the grip cover that is opposed to the outer surface of the grip main body and which has a tab portion at a distal end thereof that is arranged to be engaged with an engaging portion provided in the lever main body and the engaging portion defined by an opening, the opening extending in a longitudinal direction of the lever main body longer than a length of the tab portion the lever main body longer than a length of the tab portion, the engaging tab being inserted through an insertion hole provided in the grip main body and the opening of the lever main body to engage with the engaging portion of the lever main body unremovably with a predetermined amount of play in the longitudinal direction of the lever main body; and
    a fitting protrusion and a recess which are respectively provided in one and the other of the inner surface of the grip cover and the outer surface of the grip main body, and which are held in fitting engagement with each other for positioning the grip cover in a predetermined position relative to the grip main body.

2. The grip according to claim 1, wherein the engaging tab is elastically deformable so that the engaging tab can be brought into engagement with the engaging portion by pressing the engaging tab against the engaging portion.

3. The grip according to claim 1,
    wherein the grip cover has side edges that are opposite to each other in a width direction of the grip cover,
    wherein each of the side edges has a contoured portion that is contoured with respect to a longitudinal direction of the grip cover,
    wherein the grip main body has steps extending along the side edges of the grip cover,
    and wherein the grip cover is attached to the grip main body such that the side edges are held in close contact with the respective steps.

4. The grip according to claim 1,
    further comprising a plurality of pairs of fitting protrusions and recesses,
    and wherein the plurality of pairs are spaced apart from each other in a longitudinal direction of the grip main body.

5. The grip according to claim 4,
    wherein each of the fitting protrusions protrudes from one of the inner surface of the grip cover and the outer surface of the grip main body by a protruding distance,
    wherein the plurality of pairs include at least one pair of fitting protrusions and recesses that are circular in cross section,
    and wherein the protruding distance of the fitting protrusion of one pair is larger than the protruding distance of the fitting protrusion of the other of the plurality of pairs.

6. The grip according to claim 5,
    wherein the plurality of pairs of fitting protrusions and recesses comprise at least three pairs of fitting protrusions and recesses,
    and wherein at least one of the plurality of pairs is located between the others of the plurality of pairs in a longitudinal direction of the grip main body.

* * * * *

UNITED STATES PATENT AND TRADEMARK OFFICE
CERTIFICATE OF CORRECTION

PATENT NO. : 7,669,503 B2 Page 1 of 1
APPLICATION NO. : 11/635692
DATED : March 2, 2010
INVENTOR(S) : Toshiro Takeshima It is certified that error appears in the above-identified patent and that said Letters Patent is hereby corrected as shown below:

Claim 1, col. 11, lines 47-49, "in a longitudinal direction of the lever main body longer than a length of the tab portion the lever main body longer than a length of the tab portion," should read --in a longitudinal direction of the lever main body longer than a length of the tab portion--.

Signed and Sealed this

Eighth Day of June, 2010

David J. Kappos
*Director of the United States Patent and Trademark Office*